US010111139B2

(12) United States Patent
Hsu et al.

(10) Patent No.: US 10,111,139 B2
(45) Date of Patent: Oct. 23, 2018

(54) OFFLINE-OPERABLE WIRELESS NETWORK SYSTEM AND METHOD FOR OPERATING THE SAME

(71) Applicant: GEMTEK TECHNOLOGY CO., LTD., Hsinchu (TW)

(72) Inventors: Ching-Sung Hsu, Hsinchu (TW); Shih-Chiang Yang, Hsinchu (TW); Pao-Ching Tseng, Hsinchu (TW); Fu-Ming Yeh, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 242 days.

(21) Appl. No.: 15/153,980

(22) Filed: May 13, 2016

(65) Prior Publication Data
US 2017/0265123 A1 Sep. 14, 2017

(30) Foreign Application Priority Data

Mar. 8, 2016 (TW) .............................. 105107104 A (51) Int. Cl.
*H04W 28/18* (2009.01)
*H04W 40/34* (2009.01)
*H04W 40/24* (2009.01)
*H04W 40/04* (2009.01)
*H04W 8/26* (2009.01)
*H04W 48/16* (2009.01)
*H04W 24/04* (2009.01)
*H04L 12/26* (2006.01)
*H04W 88/08* (2009.01)

(52) U.S. Cl.
CPC .............. *H04W 28/18* (2013.01); *H04W 8/26* (2013.01); *H04W 24/04* (2013.01); *H04W 40/04* (2013.01); *H04W 40/24* (2013.01); *H04W 40/34* (2013.01); *H04W 48/16* (2013.01); *H04L 43/10* (2013.01); *H04W 88/08* (2013.01)

(58) Field of Classification Search
CPC ..... H04W 28/18; H04W 28/16; H04W 28/24; H04W 40/00; H04W 40/005; H04W 40/02; H04W 40/04; H04W 40/24; H04W 40/34

See application file for complete search history.

(56) References Cited

U.S. PATENT DOCUMENTS

| | | | |
|---|---|---|---|
| 2011/0176531 A1* | 7/2011 | Rune ..................... | H04W 76/22 370/338 |
| 2013/0331088 A1* | 12/2013 | Khalil ................... | H04W 24/04 455/422.1 |
| 2015/0173111 A1 | 6/2015 | Agarwal et al. | |
| 2015/0327306 A1* | 11/2015 | Oostveen ............... | H04W 8/30 455/423 |

* cited by examiner

*Primary Examiner* — Ashley Shivers
(74) *Attorney, Agent, or Firm* — Rosenberg, Klein & Lee (57) ABSTRACT

The present invention relates to an offline-operable wireless network system and the method for operating the same. When a wireless base station is not connected to the evolved packet core (EPC) server, the wireless base station will emulate the EPC server. Thereby, the electronic device connected with the wireless base station can be connected to the emulated EPC server, so that the wireless network functions still can be applied in the offline state and a wireless local area network can be further built.

16 Claims, 9 Drawing Sheets

OFFLINE-OPERABLE WIRELESS NETWORK SYSTEM AND METHOD FOR OPERATING THE SAME

FIELD OF THE INVENTION

The present invention relates generally to a wireless communication system and the method for operating the same, and particularly to a wireless network system in which the wireless base station can emulate the evolved packet core server when the wireless base station is not connected to the evolved packet core server and is offline operable, and to the method for operating the same.

BACKGROUND OF THE INVENTION

As wireless network technologies become mature and popular gradually, wireless surfing has become an indispensable part of people's daily lives currently. Because the Internet is a part of our daily lives, the associated networking equipment has become must-have household electronic equipment. Network users can communicate with wireless base stations through electronic devices having wireless communication functionality, such as smartphones, digital mobile assistants, notebook computers, or tablet computers. By using this communication method, no physical wire, for example, optic fibers and coaxial cables, is required for connecting to the Internet and browsing and sharing data. It is thereby a convenient networking technique.

A base station is a high-power and multi-channel wireless signal transceiver deployed at a location. The typical application of a base station is to act as a relay station for smartphones, digital mobile assistants, notebook computers, tablet computers, or other low-power wireless communication equipment. The wireless signals transmitted by the above equipment will be received and transmitted by base stations. After receiving and transmitting by multiple base stations, the wireless signals will be sent to the evolved packet core (EPC) server of Internet service providers. Then the wireless signals are transmitted to the Internet through the EPC server.

Nonetheless, as the wireless base station is not connected to the EPC server, for example, when an accident situation occurs due to power failure at the location of the EPC server or damages at the relay nodes, the wireless signal transmitted by the wireless base station cannot be received by the EPC server completely. Then the electronic devices connected with the wireless base station will disconnect from the EPC server. Under such a circumstance, the network application functions in the electronic devices will be unable to function normally.

In addition, some research institutions may need to research wireless networks or some electronic manufacturers may need to test the wireless network functions of electronic devices. Owing to data security concerns or other reasons, the above wireless network functions should be performed when the wireless base station is not connected to the EPC server while a part or all of the functions of the EPC server should be used. Furthermore, some enterprises or government institutions may need to build a closed wireless local area network and the wireless base station is not connected with the EPC server for internal usage.

Accordingly, it has become an important subject of how to enable usage of network application functions for electronic devices when there is no EPC server and the electronic devices still judge that they have connected to one. Alternatively, it is also important to build a closed wireless local area network that enables electronic devices to use a part or all of the functions provided by the EPC server when there is no connection between the wireless base station and the EPC server.

SUMMARY

An objective of the present invention is to provide an offline-operable wireless network system and the method for operating the same. When the wireless base station is not connected with the EPC server, the wireless base station can emulate the EPC server and thus enabling electronic devices to execute wireless network functions and further building a wireless local area network using offline operations.

In order to achieve the above objectives and efficacies, according to an embodiment of the present invention, a method for operating an offline-operable wireless network applicable to the condition when a wireless base station is not connected with an EPC server. The method comprises steps of the wireless base station emulating the EPC server; connecting a wireless communication module of the wireless base station with the emulated EPC server; and connecting one or more electronic device to the emulated EPC server via the wireless communication module.

According to an embodiment of the present invention, the method further comprises a step of searching one or more surrounding wireless base station in the emulation state. The wireless base station is then connected with the surrounding wireless base station.

According to an embodiment of the present invention, searching one or more surrounding wireless base station in the emulation state is performed using ping, the address resolution protocol, group broadcasting, a neighbor list, or a distributed hash table.

According to an embodiment of the present invention, the emulated EPC server assigns a local IP address to each electronic device.

In addition, the present invention provides an offline-operable wireless network system, which comprises a wireless base station and one or more electronic device. The wireless base station comprises an emulated EPC server and a wireless communication module. The emulated EPC server emulates an EPC server. The wireless communication module is connected with the EPC server or the emulated EPC server. The electronic device is connected to the EPC server or the emulated EPC server via the wireless communication module. When the wireless base station is not connected with the EPC server, the emulated EPC server emulates the EPC server. The wireless communication module is connected with the emulated EPC server. The electronic device is connected to the emulated EPC server via the wireless communication module.

According to an embodiment of the present invention, the wireless base station includes a search module, which searches one or more surrounding wireless base station in the emulation state. The wireless base station is then connected with the surrounding wireless base station.

According to an embodiment of the present invention, the search module searches one or more surrounding wireless base station in the emulation state using ping, the address resolution protocol, group broadcasting, a neighbor list, or a distributed hash table.

DETAILED DESCRIPTION

In order to make the structure and characteristics as well as the effectiveness of the present invention to be further understood and recognized, the detailed description of the present invention is provided as follows along with embodiments and accompanying figures.

According to the prior art, it has become an important subject of how to enable uninterrupted usage for electronic devices when there is no connection to the EPC server. Some application programs will detect if the electronic devices are connected to the network at startup. If not, the application program will not be started even there is a temporary file in the electronic devices. Alternatively, it is also important to build a closed wireless local area network that enables electronic devices to use a part or all of the functions provided by the EPC server when there is no connection between the wireless base station and the EPC server. Accordingly, the present invention provides an offline-operable wireless network system and the method for operating the same. When the wireless base station is not connected with the EPC server, the wireless base station can emulate the EPC server and thus enabling electronic devices to use wireless network functions and a part or all of the function of the EPC server by connecting to the emulated EPC server, and hence further building a wireless local area network.

Figure 1:
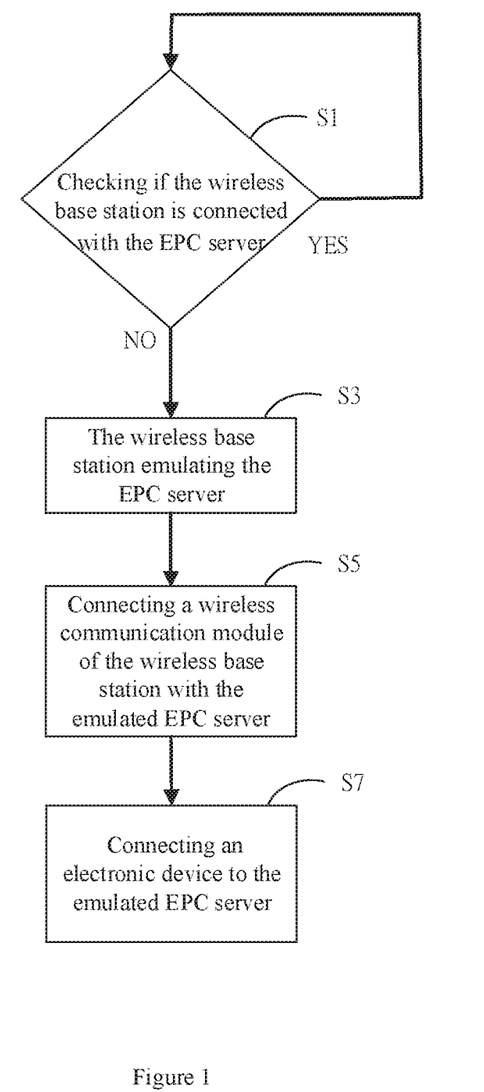
FIG. 1 shows a flowchart of the method for operating an offline-operable wireless network according to the first embodiment of the present invention.

In the following, the process of the method for operating an offline-operable wireless network according to the first embodiment of the present invention will be described. Please refer to FIG. 1, which shows a flowchart of the method for operating an offline-operable wireless network according to the first embodiment of the present invention. As shown in the figure, the method for operating a wireless network according to the present embodiment comprises steps of:

Step S1: Checking if the wireless base station is connected with the EPC server such as the server of an Internet service provider; if so, the step S1 being executed continuously; if not, the step S3 is executed;

Step S3: The wireless base station emulating the EPC server;

Step S5: Connecting a wireless communication module of the wireless base station with the emulated EPC server; and Step S7: Connecting an electronic device to the emulated EPC server via the wireless communication module of the wireless base station.

Next, the offline-operable wireless network system according to the first embodiment of the present invention will be described. Please refer to FIG. 2, which shows a block diagram of the offline-operable wireless network system according to the first embodiment of the present invention. As shown in the figure, the wireless network system according to the present invention comprises a first wireless base station 10, which comprises a wireless communication module 101, a first emulated EPC server 103, and a processing unit 105. One or more electronic device 30 is connected with the first wireless base station 10.

Figure 2:
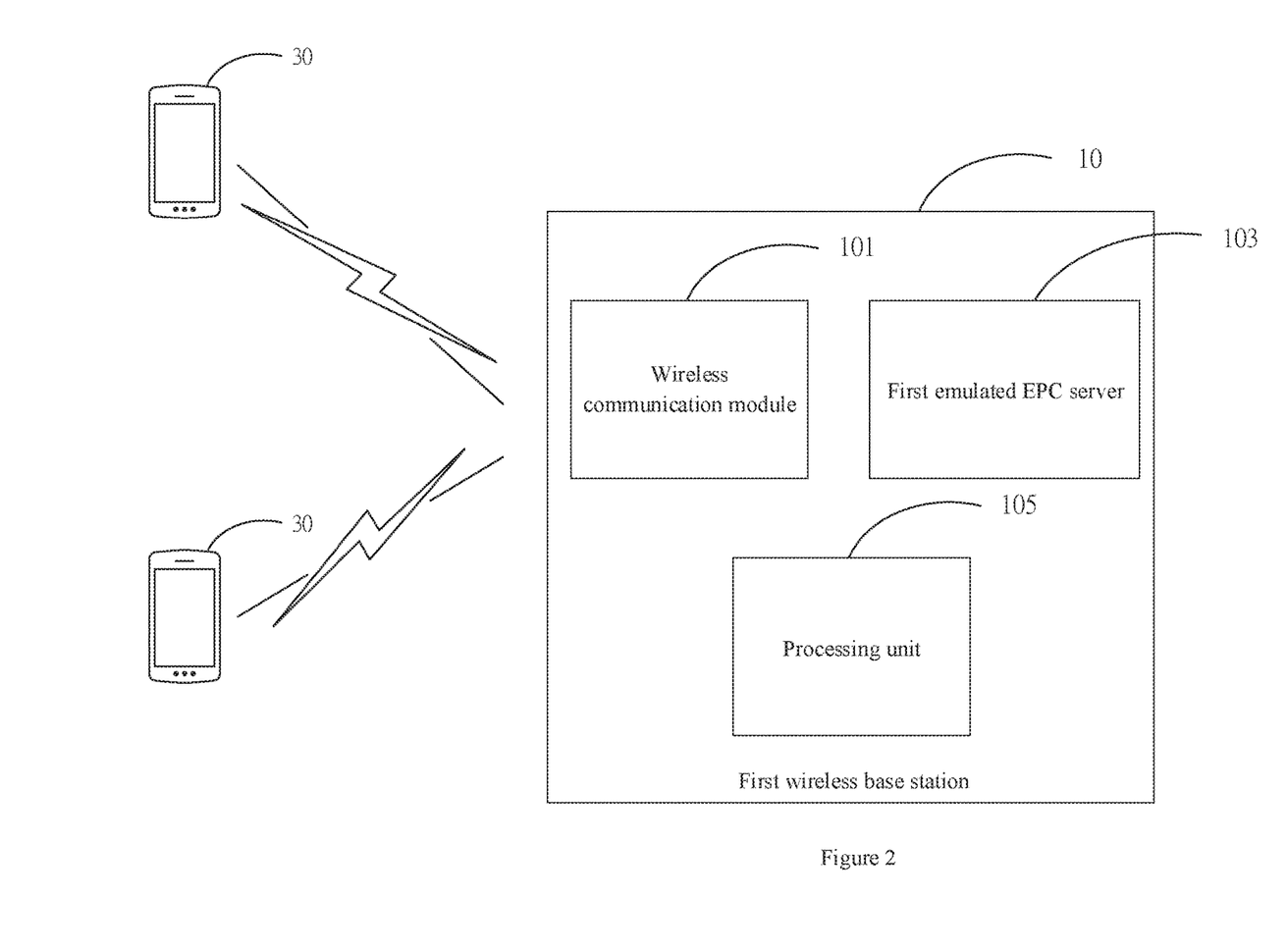
FIG. 2 shows a block diagram of the offline-operable wireless network system according to the first embodiment of the present invention.

The wireless communication module 101 described above is a module having the function of receiving and transmitting wireless signals. The wireless communication module 101 can adopt communication protocols such as LTE, Wi-Fi, GPRS, or others to receive and transmit wireless signals.

The first emulated EPC server 103 described above is used for emulating an EPC server and thus enabling the first wireless base station 10 to emulate the EPC server. The first emulated. EPC server 103 owns a part of all of the functions of a general EPC server. The first emulated EPC server 103 can include one or more of the mobility management entity (MME), serving gateway (SGW), packet data network gateway (PGW), or home subscriber server (HSS).

The processing unit 105 described above is an electronic unit capable of arithmetic and logic operations. The above electronic device 30 can be a device having wireless networking functions, including a smartphone, a personal digital assistant (PDA), a tablet computer, a notebook computer, and a desktop computer.

Figure 3A:
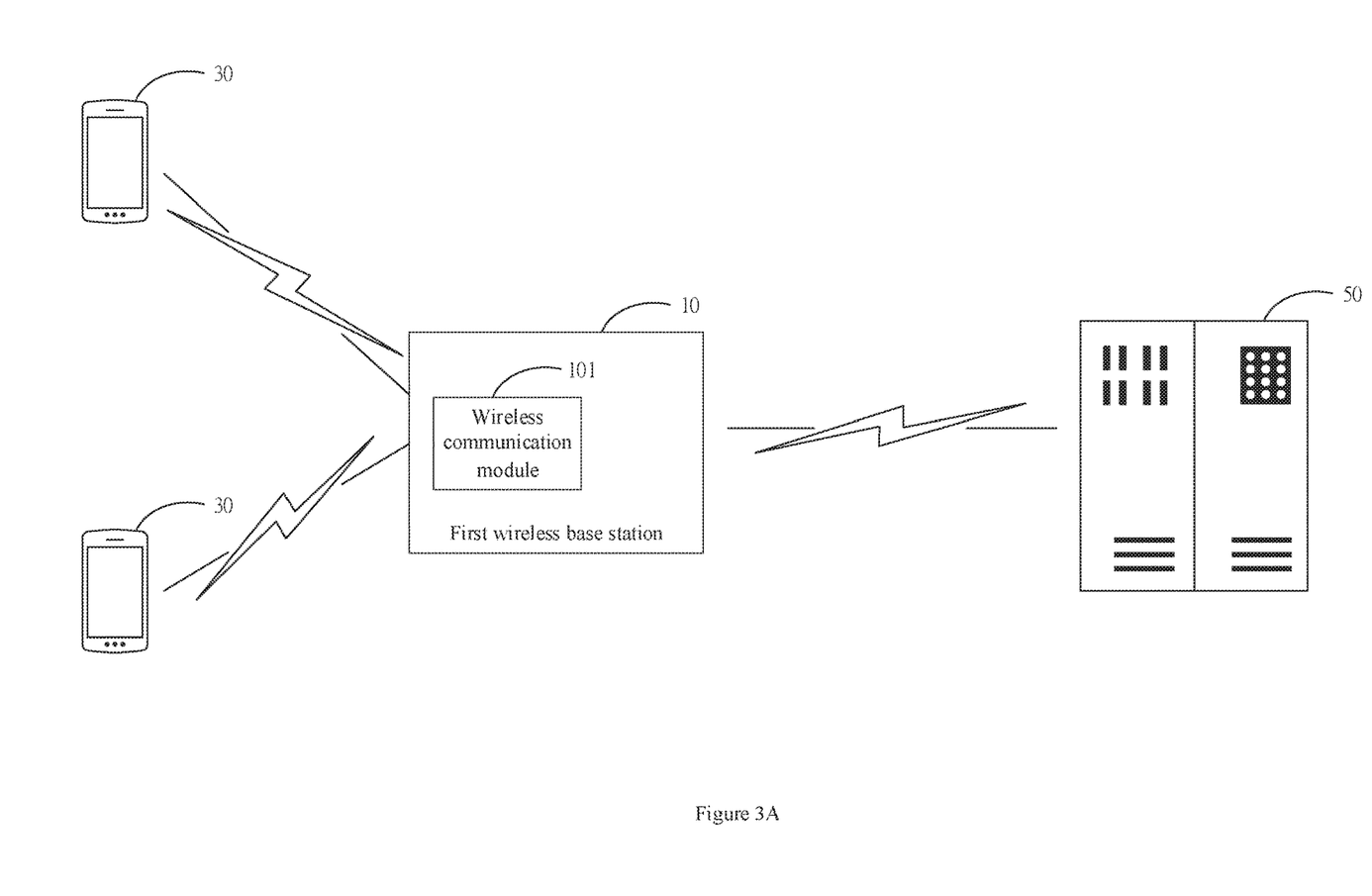
FIGS. 3A to 3C show schematic diagrams of the operations of the offline-operable wireless network system according to the first embodiment of the present invention.

In the following, the process of the method for operating an offline-operable wireless network according to the first embodiment of the present invention will be described. Please refer to FIGS. 3A to 3C as well as FIGS. 1 and 2. As shown in FIG. 3A, under the normal condition, the electronic device 30 is connected with the EPC server 50 through the wireless communication module 101 of the first wireless base station 10. In addition, the first wireless base station 10 will execute the step S1. If the first wireless base station 10 is not connected to the EPC server 50, the steps S3 through S7 will be executed.

In the step S1, whether the wireless base station 10 is connected with the EPC server 50 is checked. The processing unit 105 checks if the connection between wireless base station 10 and the EPC server 50 is normal periodically. The processing unit 105 judges if the connection between wireless base station 10 and the EPC server 50 is normal by the wireless communication module 101 pinging the EPC server 50 or the heartbeat detection result in the SCTP protocol. When the processing unit 105 judges normal, the step S1 will be continued. Otherwise, the step S3 will be executed.

According to another embodiment of the present invention, in the step S1, in addition to checking if the connection between wireless base station 10 and the EPC server 50 is normal periodically, the processing unit 105 will further check the connection between the wireless communication module 101 and the element management system (EMS), which is used for managing and configuring the parameters and states of the first wireless base station 10. The processing unit 105 judges if the wireless communication module 101 is connected with the EMS according to the returned keep-alive result of the HTTP protocol placed by the wireless communication module 101 to the EMS.

Figure 3B:
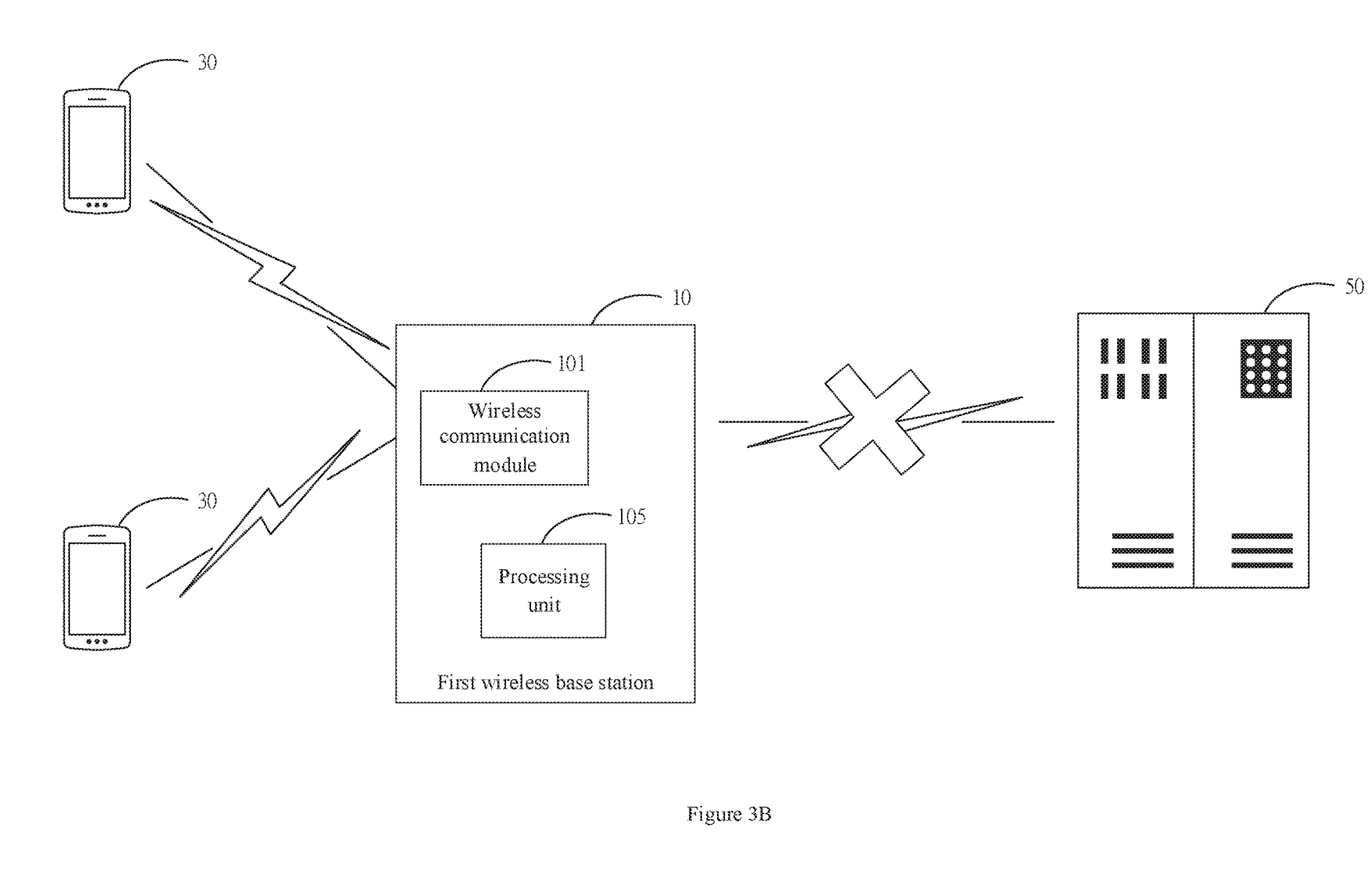
Figure 3C:
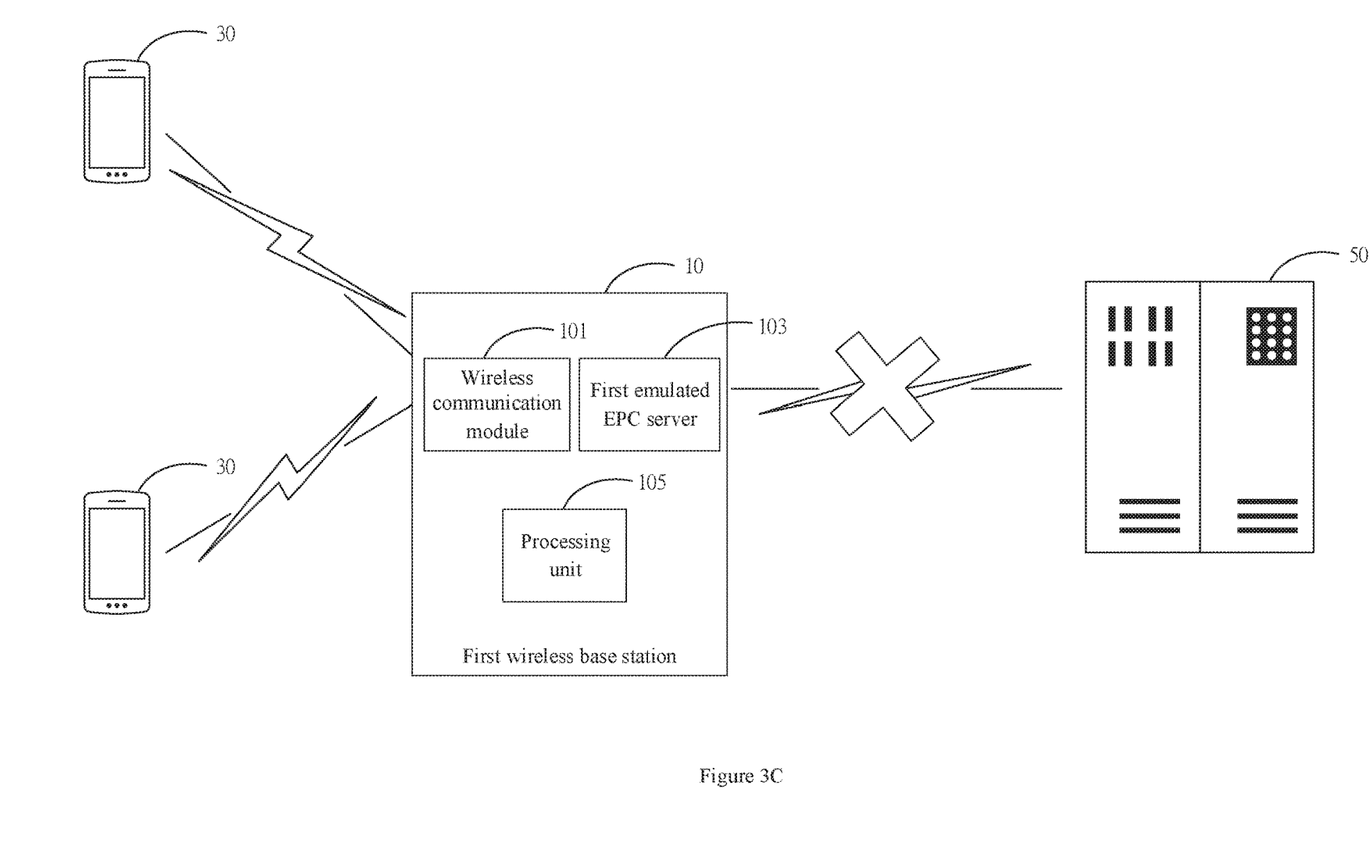

In the step S3, the wireless base station will emulate the EPC server. As shown in FIG. 3B, as the processing unit 105 judges that the wireless communication module 101 is not connected with the EPC server 50, the processing unit 105 will start the first emulated EPC server 103, as shown in FIG. 3C. Then the first wireless base station 10 can emulate the EPC server 50 through the first emulated EPC server 103. If the first emulated EPC server 103 includes one or more of the MME, SGW, PGW, or HSS, when the processing unit 105 starts the first emulated EPC server 103, the MME, SGW, PGW, or HSS contained in the first emulated EPC server 103 will be started as well. Alternatively, the processing unit 105 can also start one or more of the MME, SGW, PGW, or HSS of the first emulated EPC server 103 according to requirements.

According to an embodiment, in the step S3, the processing unit 105 starts the first wireless base station 10 first, before it starts the first emulated EPC server 103. Thereby, the cache data in the first wireless base station 10 can be cleared.

In the step S5, the wireless communication module 101 of the first wireless base station 10 is connected to the first emulated EPC server 103. In the step S7, the electronic device 30 is connected to the first emulated EPC server 103. As shown in FIG. 3C, the electronic device 30 is connected to the first emulated EPC server 103 through the wireless communication module 101. Because the first emulated. EPC server 103 includes a part or all of the function of the EPC server 50, the electronic device 30 will regard itself connected to the EPC server 50 and thus enabling normal usage of the application programs requiring prior test of the network condition. After the electronic device 30 is connected to the first emulated. EPC server 103, the first emulated EPC server 103 assigns a local IP address to the electronic device 30. If there are multiple electronic devices 30 connected to the first emulated EPC server 103, the first emulated EPC server 103 will assign one local IP address for each of the electronic devices 30.

When the first emulated EPC server 103 assigns a local IP address to the electronic device 30, it does so according to the local IP address of the first wireless base station 10. For example, if the IP address of the first wireless base station 10 is 10.102.81.22, the local IP address assigned by the first emulated EPC server 103 to the electronic device 30 can be one of 192.168.22.1~192.168.22.254 and thus forming a wireless local area network.

Up to now, the method for operating an offline-operable wireless network according to the first embodiment of the present invention is completed. According to the method, when the wireless base station is not connected with the EPC server, the wireless base station emulates the EPC server. Then the electronic device can connect to the emulated EPC server and use a part or all of the application functions of the EPC server related to the network. Thereby, while experimenting, developing, or testing the functions of the electronic device, the electronic device can connect to the emulated EPC server instead of a normal one. Hence, the functions of the electronic device related to the network can be experimented, developed, or tested. Thanks to no connection to the exterior, the data in the experiment, development, or test will not leak. This method also saves the cost for renting an EPC server. Besides, since the emulated EPC server assigns a local IP address to each of the electronic devices connected with the emulated EPC server, a wireless local area network can be built.

Figure 4:
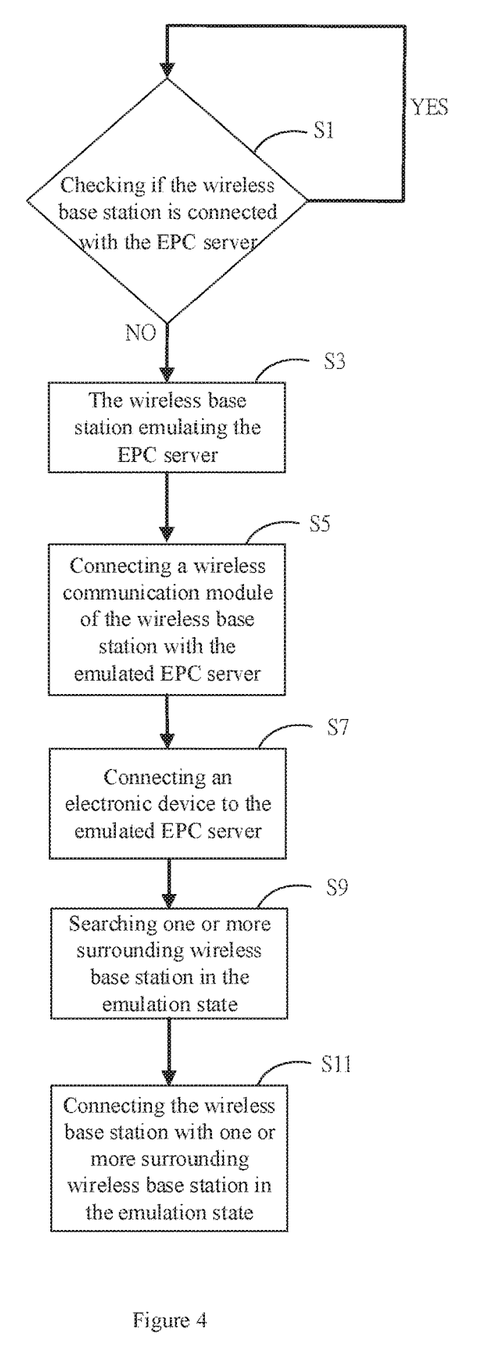
FIG. 4 shows a flowchart of the method for operating an offline-operable wireless network according to the second embodiment of the present invention.

Next, the process of the method for operating an offline-operable wireless network according to the second embodiment of the present invention will be described. Please refer to FIG. 4, which shows a flowchart of the method for operating an offline-operable wireless network according to the second embodiment of the present invention. The difference between the process according to the present embodiment and the one according to the first embodiment is that the method according to the present embodiment further comprises a step S9 for searching one or more surrounding wireless base station in the emulation state and a step S11 for connecting the wireless base station with the one or more surrounding wireless base station in the emulation state.

Next, the offline-operable wireless network system according to the second embodiment of the present invention will be described. Please refer to FIG. 5, which shows a block diagram of the offline-operable wireless network system according to the second embodiment of the present invention. The difference between the system according to the present embodiment and the one according to the first embodiment is that the former further comprises a second wireless base station 70 and one or more electronic device 90. In addition, the first wireless base station 10 further comprises a search module 107. The second wireless base station 70 described above includes a wireless communication module 701, a second emulated EPC server 703, a processing unit 705, and a search module 707. The one or more electronic device 90 is connected with the second wireless base station 70. The above search module 107 can transmit enquiry packets in a wired or wireless method for searching wireless base stations surrounding the first wireless base station 10. According to the present embodiment, the second wireless base station 70 is just the surrounding wireless base station.

Figure 5:
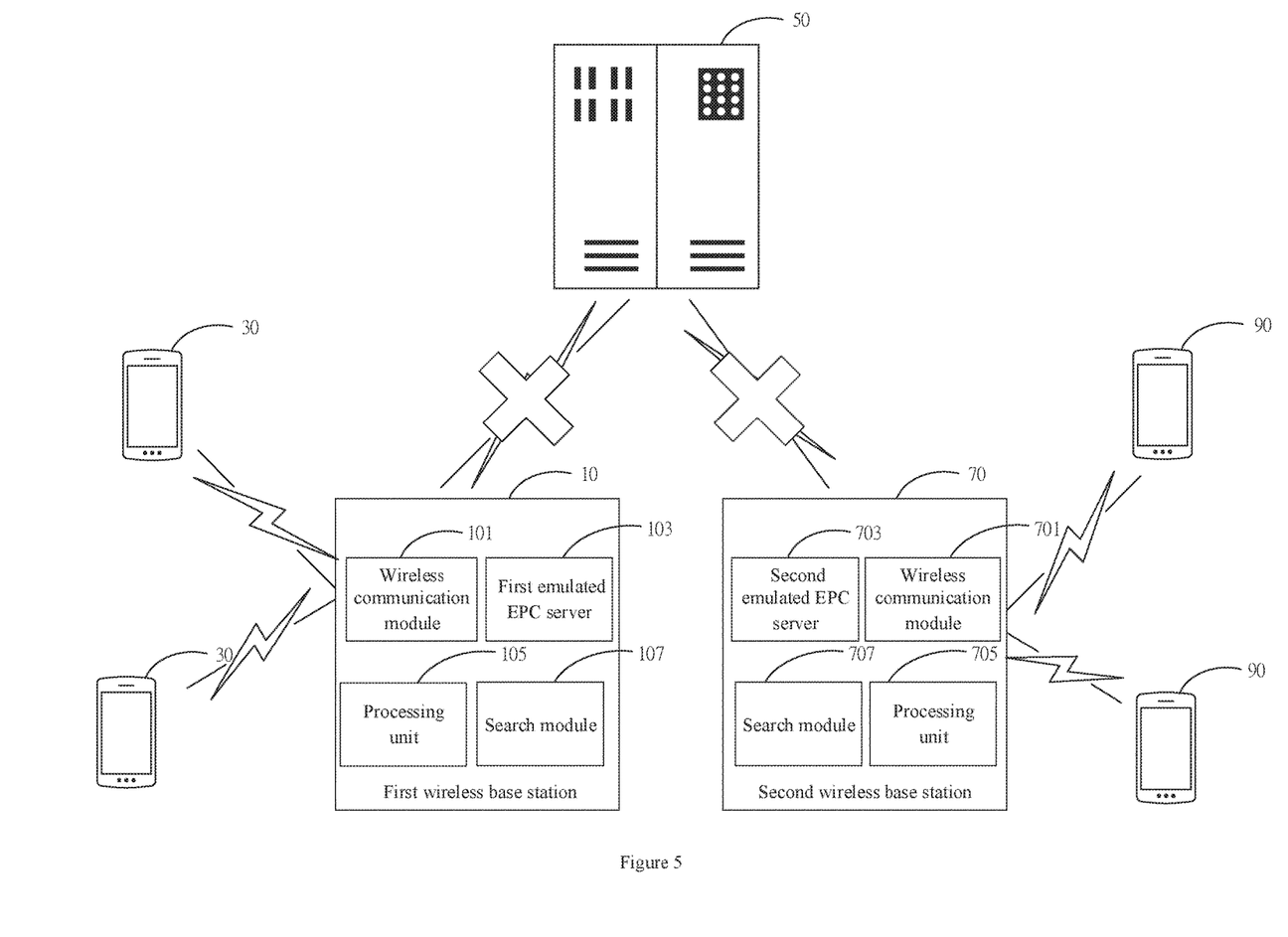
FIG. 5 shows a block diagram of the offline-operable wireless network system according to the second embodiment of the present invention.

The wireless communication module 701 of the above second wireless base station 70 has identical functions of the wireless communication module 101 of the first wireless base station 10. The above second emulated EPC server 703 has identical functions of the first emulated EPC server 103. The search unit 707 of the above second wireless base station 70 has identical functions of the search unit 107 of the first wireless base station 10. The processing unit 705 of the above second wireless base station 70 has identical functions of the processing unit 105 of the first wireless base station 10. The above electronic device 90 can be an electronic device having wireless networking functionality, such as a smartphone, a. PDA, a tablet computer, a notebook computer, and a desktop computer.

According to the present embodiment, one second wireless base station 70 is used for description. In practical situations, a plurality of second wireless base stations 70 can be adopted.

In the following, the process of the method for operating an offline-operable wireless network according to the second embodiment of the present invention will be described. Please refer to FIGS. 6A and 6B as well as FIGS. 4 and 5. The steps S1 to S7 according to the present embodiment are identical to those according to the first embodiment. Hence, the details will not be described again.

Figure 6A:
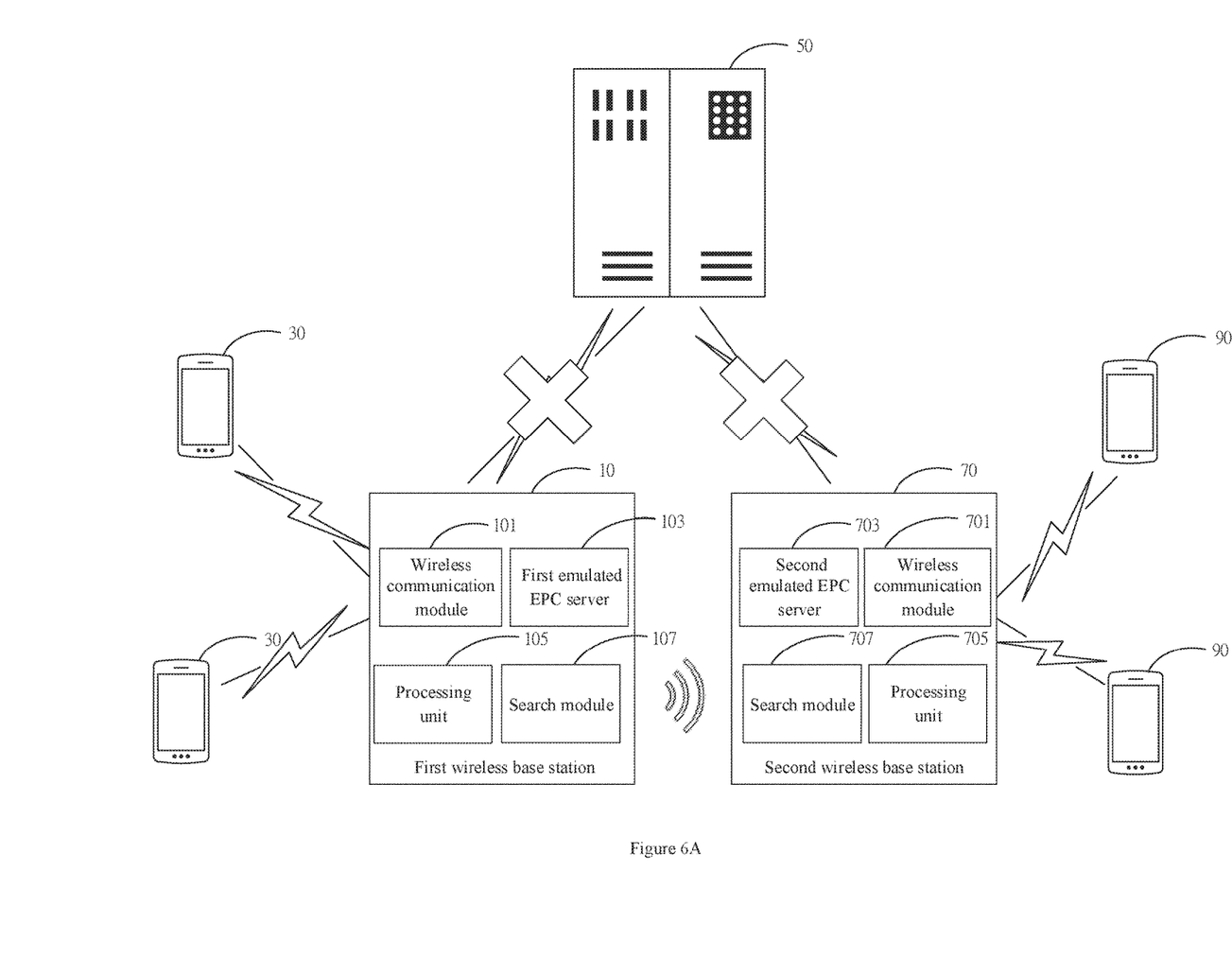
FIGS. 6A to 6B show schematic diagrams of the operations of the offline-operable wireless network system according to the second embodiment of the present invention.

The step S9 searches one or more surrounding wireless base station in the emulation state. As shown in FIG. 6A, the wireless base stations are disposed manually by considering the communication range, transmission power, and signal attenuation for location selection. Thereby, in general, there will be nearby wireless base stations surrounding a wireless base station. As a consequence, the search module 107 of the first wireless base station 10 will search and get surrounding wireless base stations in the emulation state that emulate the EPC server 50.

During the process of disposing wireless stations, the nearby wireless base stations will be configured to the same network segment in advance. The search module 107 can use the ping command to search the surrounding wireless base stations. For example, the first wireless base station 10 belongs to the network segment 10.102.81.XX. The search module 107 can transmit a ping packet to one or more IP address in the network segment of the first wireless base station 10, namely, 10.102.81.1~10.102.81.255. If the search module 107 receives a response packet corresponding to the transmitted ping packet, it means that the surrounding wireless base station corresponding to the IP address is in the emulation state. For example, the search module 107 transmits ping packets to the IP addresses 10.102.81.1 to 10.102.81.255 and receives two response packets corresponding to the IP addresses of 10.102.81.5 and 10.102.81.91. It means that the wireless base stations corresponding to these two IP addresses are in the emulation state.

In addition, the search module 107 can also search other surrounding wireless base station in the emulation state via the address resolution protocol (ARP). The search module 107 can transmit an ARP request packet to one or more IP address in the network segment of the first wireless base station 10, namely, 10.102.81.1~10.102.81255. If the search module 107 receives an ARP response packet corresponding to the ARP request packet, it means that the surrounding wireless base station corresponding to the ARP response packet is in the emulation state.

Moreover, the first wireless base station 10 and the surrounding base stations can be set to the same group during the configuration process. If the search module 107 receives a group broadcast packet, it means that the surrounding wireless base station corresponding to the IP address in the group broadcast packet is in the emulation state.

Alternatively, a neighbor list can be stored in the first wireless base station 10 during the process of configuring the first wireless base station 10. This neighbor list records the IP addresses of one or more surrounding wireless base stations of the first wireless base station 10. The search module 107 will transmit request packets according to the IP addresses recorded in the neighbor list. If the search module 107 receives a response packet corresponding to the request packet, it means that the surrounding wireless base station corresponding to the IP address is in the emulation state.

Furthermore, the search module 107 can also use a distributed hash table (DHT) method to search other wireless base stations. While searching, the search module 107 transmits a request packet to the surrounding base stations according to a key. If the search module 107 receives a response packet corresponding to the request packet, it means that the surrounding wireless base station is in the emulation state.

Figure 6B:
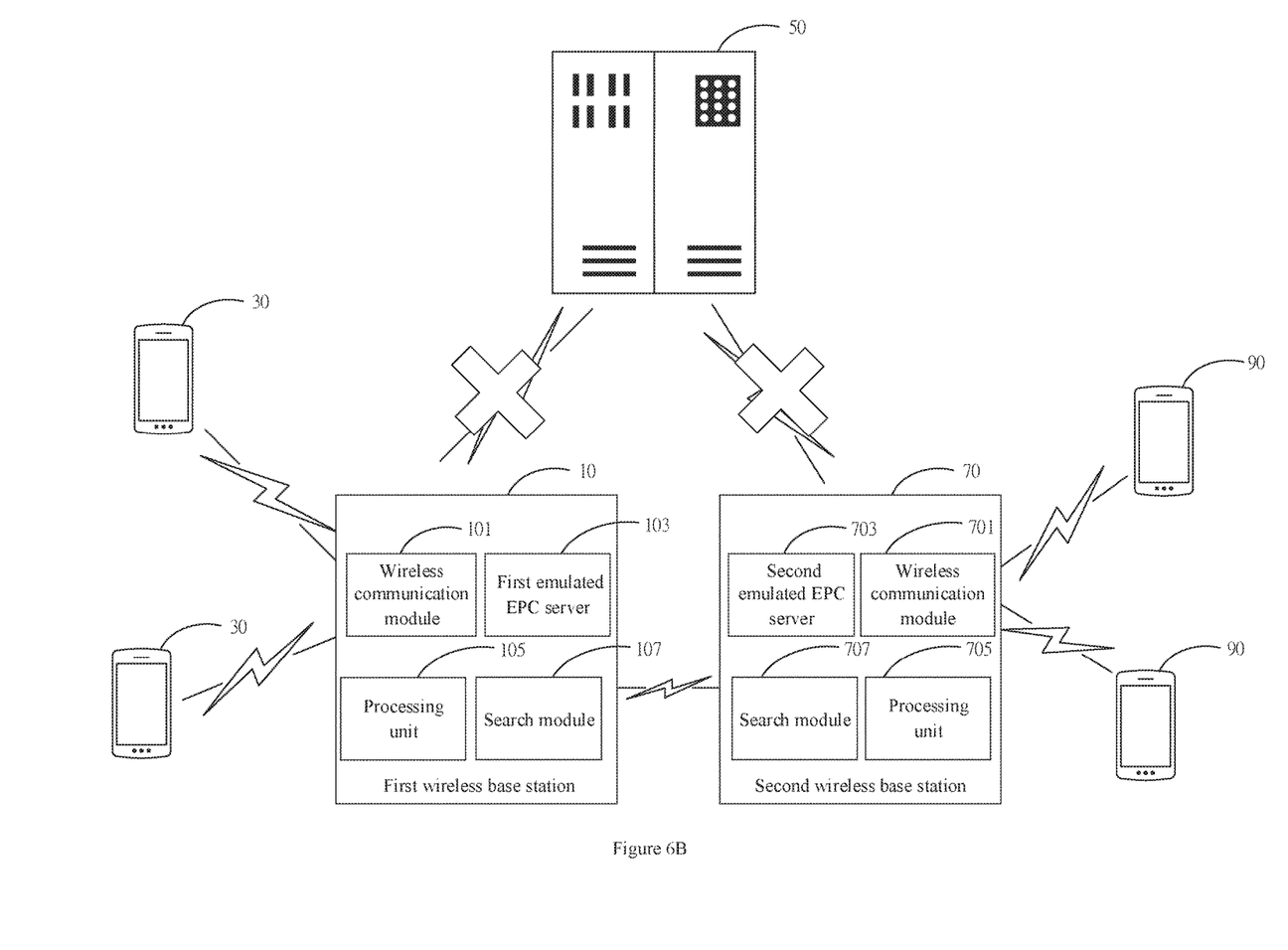

In the step S11, the wireless base station is connected to one or more surrounding base station in the emulation state. The first wireless base station 10 is connected to the surrounding base station in the emulation state searched in the step S9 for increasing the number of electronic devices to which each electronic device can connect and thus broadening the communication range of each electronic device. As shown in FIG. 6B, after the search module 107 of the first wireless base station 10 searches and gets the surrounding wireless base station (according to the present embodiment, the search module 107 searches and gets the second wireless base station 70), the first emulated EPC server 103 is connected to the second emulated EPC server 703 using a wired or wireless networking method.

According to an embodiment of the present invention, the second wireless base station 70 stores a neighbor list, which records the IP addresses of the surrounding wireless base stations of the second wireless base station 70. In the step S9, the search module 107 searches other surrounding wireless base stations according to the neighbor list stored in the first wireless base station 10. After the search module 107 searches and gets the second wireless base station 70, and the first wireless base station 10 is connected with the second wireless base station 70, the second wireless base station 70 sends its own neighbor list to the first wireless base station 10. The processing unit 105 of the first wireless base station 10 compares the IP addresses recorded in the neighbor list of the second wireless base station 70 with those recorded in the neighbor list of the first wireless base station 10. If there are some IP addresses in the neighbor list of the second wireless base station 70 not found in the neighbor list of the first wireless base station 10, the processing unit 105 will record the IP addresses in the neighbor list of the second wireless base station 70 not found in the neighbor list of the first wireless base station 10 in the neighbor list of the first wireless base station 10. Then the search unit 107 sends request packets to the IP addresses according to the updated neighbor list for searching other surrounding wireless base stations in the emulation state.

After the steps according to the present embodiment are executed, the range of the wireless local area network is broadened to the electronic devices 30, 90 connected to the first and second wireless base stations 10, 70. The electronic device 30 can transmit data with the electronic device 90 through the first emulated EPC server 103 of the first wireless base station 10 and the second emulated EPC server 703 of the second wireless base station 70.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for operating an offline-operable wireless network, applicable to the condition when a wireless base station is not connected with an evolved packet core server, comprising steps of:
    said wireless base station emulating said evolved packet core server;
    connecting a wireless communication module of said wireless base station with said emulated evolved packet core server; and
    connecting one or more electronic devices to said emulated evolved packet core server via said wireless communication module; and
    searching one or more surrounding wireless base stations in the emulation state and connecting said wireless base station with said one or more surrounding wireless base stations.

2. The method for operating an offline-operable wireless network of claim 1, wherein said searching one or more surrounding wireless base stations in the emulation state further comprises transmitting a ping packet to one or more IP addresses in the network segment of said wireless base station, and the one or more surrounding wireless base stations corresponding to the one or more IP addresses is in the emulation state if a response packet corresponding to said ping packet is received.

3. The method for operating an offline-operable wireless network of claim 1, wherein said searching one or more surrounding wireless base stations in the emulation state further comprises transmitting a request packet of address resolution protocol to one or more IP addresses in the network segment of said wireless base station, and the one or more surrounding wireless base stations corresponding to the one or more IP addresses is in the emulation state if a response packet of address resolution protocol corresponding to said request packet of address resolution protocol is received.

4. The method for operating an offline-operable wireless network of claim 1, further comprising a step of setting said wireless base station and said one or more surrounding wireless base stations as a group; where in said searching one or more surrounding wireless base stations in the emulation state, if a group broadcast packet is received, the one or more surrounding wireless base stations corresponding to one or more IP addresses in said group broadcast packet is in the emulation state.

5. The method for operating an offline-operable wireless network of claim 1, wherein said wireless base station stores a neighbor list, and said searching one or more surrounding wireless base stations in the emulation state further comprises transmitting a request packet to one or more IP addresses in said neighbor list, and the one or more surrounding wireless base stations corresponding to the one or more IP addresses is in the emulation state if a response packet corresponding to said request packet is received.

6. The method for operating an offline-operable wireless network of claim 5, and further comprising steps of:
  acquiring a neighbor list of said one or more surrounding wireless base stations; and
  updating said neighbor list of said wireless base station according to said neighbor list of said one or more surrounding wireless base stations, and transmitting said request packets to the IP addresses in said updated neighbor list.

7. The method for operating an offline-operable wireless network of claim 1, wherein said searching one or more surrounding wireless base stations in the emulation state further comprises transmitting a request packet to said one or more surrounding wireless base stations according to a key, where said one or more surrounding wireless base stations are in the emulation state if a response packet corresponding to said request packet is received.

8. The method for operating an offline-operable wireless network of claim 1, wherein said emulated evolved packet core server assigns a local IP address to each electronic device.

9. An offline-operable wireless network system, comprising:
  a wireless base station, comprising an emulated evolved packet core server and a wireless communication module, said emulated evolved packet core server emulating an evolved packet core server, and said wireless communication module connected to said evolved packet core server or said emulated evolved packet core server; and
  one or more electronic devices, connected to said evolved packet core server or said emulated evolved packet core server via said wireless communication module;
  where when said wireless base station is not connected with said evolved packet core server, said emulated evolved packet core server emulates said evolved packet core server, said wireless communication module is connected with said emulated evolved packet core server, and said one or more electronic devices are connected with said emulated evolved packet core server via said wireless communication module, said wireless base station further comprises a search module for searching one or more surrounding wireless base stations in the emulation state and said wireless base station connects with said one or more surrounding wireless base stations.

10. The offline-operable wireless network system of claim 9, wherein said search module of said wireless base station transmits a ping packet to one or more IP addresses in the network segment of said wireless base station, and the one or more surrounding wireless base stations corresponding to the one or more IP addresses is in the emulation state if a response packet corresponding to said ping packet is received by said search module.

11. The offline-operable wireless network system of claim 9, wherein said search module of said wireless base station transmits a request packet of address resolution protocol to one or more IP addresses in the network segment of said wireless base station, and the one or more surrounding wireless base stations corresponding to the one or more IP addresses is in the emulation state if a response packet of address resolution protocol corresponding to said request packet of address resolution protocol is received by said search module.

12. The offline-operable wireless network system of claim 9, wherein said wireless base station and said one or more surrounding wireless base stations are set as a group; if said search module receives a group broadcast packet, the one or more surrounding wireless base stations corresponding to one or more IP addresses in said group broadcast packet is in the emulation state.

13. The offline-operable wireless network system of claim 9, wherein said wireless base station stores a neighbor list; said search module transmits a request packet to one or more IP addresses in said neighbor list; and the one or more surrounding wireless base stations corresponding to the one or more IP addresses is in the emulation state if a response packet corresponding to said request packet is received by said search module.

14. The offline-operable wireless network system of claim 13, wherein said one or more surrounding wireless base stations stores a neighbor list; said wireless base station acquires said neighbor list of said one or more surrounding wireless base stations; said wireless base station updates said neighbor list of said wireless base station according to said neighbor list of said one or more surrounding wireless base stations; and said wireless base station transmits said request packet to the IP addresses in said updated neighbor list.

15. The offline-operable wireless network system of claim 9, wherein sad search module of said wireless base station transmits a request packet to said one or more surrounding wireless base stations according to a key; and said one or more surrounding wireless base stations are in the emulation state if a response packet corresponding to said request packet is received by said search module.

16. The offline-operable wireless network system of claim 9, wherein said emulated evolved packet core server assigns a local IP address to each electronic device.

* * * * *